United States Patent [19]

Eid et al.

[11] Patent Number: 5,210,638
[45] Date of Patent: May 11, 1993

[54] ELECTROLYTE MATERIAL AND LIGHT MODULATION DEVICES USING THE SAME

[75] Inventors: Bernard Eid, Champagne/Seine; Pascal Marque, Fontainebleau; Jean-Pierre Themont, Montigny/Loing, all of France

[73] Assignee: Corning Incorporated, Corning, N.Y.

[21] Appl. No.: 810,192

[22] Filed: Dec. 19, 1991

[30] Foreign Application Priority Data

Jan. 10, 1991 [FR] France .................. 91 00223

[51] Int. Cl.⁵ .............. G02F 1/15; G02F 1/153; G02F 1/00; H01M 6/04
[52] U.S. Cl. .................. 359/265; 359/270; 359/275; 359/322; 252/583; 252/586; 429/188
[58] Field of Search ........... 359/265, 322, 270, 275; 204/129.75; 252/583, 586; 429/188

[56] References Cited

U.S. PATENT DOCUMENTS

| | | | |
|---|---|---|---|
| 3,873,185 | 3/1975 | Rogers | 252/586 |
| 3,912,368 | 10/1975 | Ponjee et al. | 252/583 |
| 4,308,324 | 12/1981 | Newman | 429/188 |
| 4,340,624 | 7/1982 | Yamashita et al. | 359/265 |
| 4,591,453 | 5/1986 | Kobayashi | 429/188 |
| 4,752,544 | 6/1988 | Gregory | 429/188 |
| 4,810,067 | 3/1989 | Demiryont | 359/265 |
| 4,993,810 | 2/1991 | Demiryont | 359/265 |
| 5,128,013 | 7/1992 | Helms | 359/265 |
| 5,145,609 | 9/1992 | Varaprased et al. | 252/586 |
| 5,151,224 | 9/1992 | Madou et al. | 252/586 |

*Primary Examiner*—Bruce Y. Arnold
*Assistant Examiner*—Evelyn A. Lester
*Attorney, Agent, or Firm*—C. S. Janes, Jr.

[57] ABSTRACT

This invention is directed to an electrolytic material for use in light modulation devices. The material consists essentially of four components:

(1) at least one organic solvent;
(2) at least one salt of an electrodepositable metal;
(3) at least one organic acid; and
(4) at least one salt of a non-electrodepositable metal which facilitates the dissolution of the salt of the electrodepositable metal.

15 Claims, No Drawings

ELECTROLYTE MATERIAL AND LIGHT MODULATION DEVICES USING THE SAME

BACKGROUND OF THE INVENTION

The present invention relates to a material for use in light modulation devices either by variable reflection of light or by variable transmission of light. Also within the scope of this invention are various electro-optical devices using the material such as windows, screens, automotive windshields and sunroofs, obturators, variable reflection rear view mirrors, displays, etc.

In particular, the invention relates to a material where the light modulation effect is obtained through the reversible electrodeposition of a metallic layer onto a transparent electrode surface from the metallic ions contained in the material, Light modulation devices are known where two glass sheets coated with an electrically conducting transparent layer made of tin oxide or indium tin mixed oxide are separated by a thin layer of an electrolytic material, thereby constituting an electrolytic cell.

When a voltage is applied across the electrodes of such a cell, an absorbing and/or reflecting metallic layer appears onto the negatively charged (cathode) electrode due to the electrochemical reduction of the metallic ions that are present in the material. Simultaneously, an oxidation electrochemical reaction occurs at the positively charged electrode (anode). These two reactions have to be either electrochemically or chemically reversible in order to allow the cell to return to its maximum transmission state, either by applying a reversed voltage, or by shorting the electrodes, or at least by spontaneous bleaching in open circuit. It might be desirable for applications such as windows or rear view mirrors to keep the cell in a defined light reflection and/or absorption state during a period of time up to several hours before restoring the initial maximum transmission state.

Examples of such devices for use in small area displays where the optically active layer is silver are described in French Pat. Nos. 2,260,167, 2,352,361, 2,468,179 and 2,618,571 and U.S. Pat. Nos. 3,245,313 and 3,626,410. U.S. Pat. No. 3,153,113 relates to large area variable transmission devices. These devices of the prior art use water-based electrolytic materials. In this case, the addition of a strong mineral acid is needed in order to avoid hydrolysis of the metallic salts in solution. These materials generally exhibit low pH and have a tendency to favor hydrogen evolution concurrently to the metal electrodeposition, and/or to induce the degradation of the electronically conducting transparent materials. Organic electrolytic materials have also been proposed, such as those based on methanol (See, e.g., French Pat. No. 2,352,361) or a methanol/acetonitrile mixture (French Pat. No. 2,468,179), which exhibit a poor thermal stability due to the low boiling points of the proposed solvents, thereby limiting their range of application. Furthermore, the electrolytic materials used in these devices do not allow the electrodeposition of an absorbing and/or reflecting metal layer onto a large area surface without using complicated structures for the cell, such as those described in the articles from S. Zaromb (J. Electrochem. Soc., vol. 109 (1962) pages 903 and 912). The use of some devices is limited to the reflection mode owing to an embodiment where the anode is made of thick metal foils for stability and response speed reasons, and/or to the use of an opaque solid electrolyte. In the case of the devices described in U.S. Pat. No. 3,153,113, a homogeneous absorbing metallic layer is obtained on a surface having an area of one square foot by using a grid as the anode and a superimposed alternative voltage in addition to the DC operating voltage.

SUMMARY OF THE INVENTION

The present invention is aimed at avoiding the hereabove described drawbacks and is directed to electrolytic materials for use in light modulation devices exhibiting an increased thermal stability, together with the ability to produce light absorbing and/or reflecting metallic deposits in large area devices having a simple structure. Precisely, the invention describes an electrolytic material for light modulation purposes made of an homogeneous solution comprising:

(A) at least one organic solvent; and
(B) at least one salt of an electrodepositable metal; characterized in that it further contains
(C) at least one organic acid, and
(D) at least one salt of a non-electrodepositable metal which facilitates the dissolution of the metallic salt (B).

Another object of this invention is to provide an electro-optical device comprising a transparent cathode and an anode with their inner facing surfaces coated with an electrically conducting material, the space between the cathode and the anode being filled with an electrolytic material made of an homogeneous solution comprising:

(A) at least one organic solvent; and
(B) at least one salt of an electrodepositable metal; characterized in that it further contains
(C) at least one organic acid, and
(D) at least one salt of a non-electrodepositable metal which facilitates the solubilization of the metallic salt (B).

In a preferred embodiment, the cathode is also transparent. Preferably, the transparent material used for both cathode and anode is glass.

GENERAL DESCRIPTION OF THE INVENTION

The organic solvent or mixture of organic solvents (A) according to the invention has preferably a boiling point higher than 100° C. and/or a freezing point lower than 0° C. in order to be liquid within a useful range of temperatures. Most preferably, the solvent (A) is chosen to have both a boiling point higher than 100° C. and a freezing point lower than 0° C. As non-limitative examples of such solvents, one may use propylene carbonate, gamma-butyrolactone, acetonitrile, benzonitrile, ethylene glycol, oligomers and polymers of ethylene glycol, and the corresponding aliphatic ethers and esters, glycerol, tributyl phosphate, 1,4-dioxanne, sulfolane, dimethyl sulfite, etc. The electrochemical stability range of the chosen solvent or mixture of solvents ought to be compatible with the electrochemical reactions produced by the darkening and bleaching processes of the device. A non-limitative list of solvents is given hereafter where the component (A) may be chosen according to this invention, as a single solvent or a mixture of solvents.

| Solvent | Boiling Point °C. | Freezing Point °C. |
|---|---|---|
| Propylene carbonate | +242 | −55 |
| Γ-butyrolactone | +205 | −42 |

-continued

| Solvent | Boiling Point °C. | Freezing Point °C. |
|---|---|---|
| Acetonitrile | +82 | −48 |
| Benzonitrile | +190 | −15 |
| Ethylene glycol | +197 | −11 |
| Diethylene glycol | +244 | −10 |
| Triethylene glycol | +288 | −7 |
| Tetraethylene glycol | +308 | −6 |
| Ethoxyethylene glycol | +135 | −90 |
| Dibutoxydiethylene glycol | +255 | −60 |
| 1,4-dioxane | +101 | −12 |
| Sulfolane | +282 | −27 |
| Glycerol | +290 | −20 |

According to the invention, the component (B) may be a salt of a metal, or several salts of metals chosen among the salts of cathodically electrodepositable metals belonging to the group of zinc, lead, silver, copper, iron, nickel, tin, indium, platinum, palladium, gold, bismuth, antimony, tellurium, manganese, thallium, selenium, gallium, arsenic, mercury, chromium, tungsten and molybdenum. Currently, the preferred metals are copper and bismuth. Most preferably, a combination of a salt of copper (I) and a salt of another electrodepositable metal may be used where the copper (I) salt advantageously plays the role of an auxiliary redox couple member. In fact, besides its ability to form an electrodeposited copper layer onto the cathode, Cu (I) salt advantageously plays anodic reaction: $Cu(I) \rightarrow Cu(II) = e_-$. The choice of anod the anion of the component (B) is not critical and may be, as examples, chloride, nitrate, sulfate, iodide, bromide, fluoride, etc. Preferably, the salt (B) will be a chloride, bromide and/or iodide, because halides can play the role of an auxiliary redox couple member, inasmuch as they can be reversibly oxidized onto the anode of a device prepared according to the invention during the darkening phase.

According to this invention, it has been found necessary to add at least one organic acid (C) in the electrolytic material. The absorbing and/or reflecting properties of the metal deposits and the reversibility and the homogeneity of the electro-optical effect are significantly improved when the electrolytic material contains at least one acid chosen among carboxylic acids such as aliphatic monoacids, e.g., formic, acetic, propionic, etc., polyacids and polyfunctional acids, e.g., lactic and levulinic. Preferred acids are acetic acid and levulinic acid and their mixture.

Because the solvents (A) and acids (C) and their mixtures are poor solvents for the salts (B), it has been found necessary to add at least one auxiliary salt (D) to the electrolytic material in order to facilitate the dissolution of the component (B). The component (D) may be any salt of a non-electrodepositable metal, the anion of which induces a "complexation" effect on the metallic ion of the component (B). Anions of the component (D) are preferably halides: chloride, bromide and/or iodide. The cation of the salt (D) may be an alkali metal, such as Na, K, and/or Li, and/or an alkaline earth metal such as Ca, Mg, Sr and/or Ba. Preferably, a lithium salt is used and, most preferably, lithium bromide.

According to this invention, it has also been found advantageous, but not necessary, to add an auxiliary salt (E) to the electrolytic material. This component (E) is a salt of an alkali metal or an alkaline earth metal, the anion of which is poorly complexing of the electrodepositable metal of component (B). Examples of such anions are fluoroborates, perchlorates, etc. In fact, the presence of this auxiliary salt (E) has been found to improve the cycling properties of the electrolytic material. A preferred salt (E) is lithium perchlorate. The reason for the improvement given by the presence of the component (E) has not been explained.

The proportions of the various components of the electrolytic material may vary greatly according to the specific nature of each component and particularly the solvent (A) and the acid (C). By way of illustration and not by way of limitation, the proportion of solvent (A) may vary from 10% to 60% by weight, that of acid (C) from 30% to 80% by weight, that of salt (B) from 0.01% by weight to the saturation limit, and that of salt (D) from 0.01% by weight to the saturation limit. The optional salt (E) may be added in proportion varying up to the limit of saturation. The invention will be further understood by referring to the following detailed examples which are presented by way of illustration and not by way of limitation.

DESCRIPTION OF PREFERRED EMBODIMENTS

EXAMPLE 1

This example illustrates the use of an electrolytic material of this invention yielding good performance in cycling and low transmission maintaining of the device. An electrolytic material having the following composition is prepared.

| Γ-butyrolactone | 20% by weight |
|---|---|
| Acetic acid | 62% by weight |
| Bismuth (III) chloride | 1.35% by weight |
| Copper (I) chloride | 1.35% by weight |
| Lithium bromide | 8.55% by weight |
| Lithium perchlorate | 6.75% by weight |

A transparent cell is assembled using two electrodes made of tin oxide coated glass sheets having a sheet resistivity of 4 ohms per square (GLASTRON). The gap separating the two electrodes is 50 micron thick. The cell is filled with the electrolytic material in order to create an active surface of 12 cm$^2$ (3 cm $\times$ 4 cm). The initial optical transmission lies between 65 and 75% in the visible wavelength range. By applying 2 volts across the electrodes, a fast darkening of the cell is observed. Turning the device back to its initial high transmission state can be obtained, either by short circuiting the electrodes or by applying a reversed voltage of lower magnitude than the darkening voltage, in order to avoid the electrodeposition of the absorbing metallic layer onto the former anode. Bleaching can also be obtained in open circuit conditions. After darkening, the cell can be maintained in a transmission state below 10% by applying an appropriate voltage without affecting the bleaching characteristics. The cell can be cycled repeatedly while keeping its properties for at least 30,000 cycles.

EXAMPLE 2

This example illustrates the use of an electrolytic material of this invention yielding high optical density levels for medium size devices. An electrolytic material having the following composition is prepared:

| Γ-butyrolactone | 17.6% by weight |
|---|---|
| Acetic acid | 54.0% by weight |
| Levulinic acid | 20.0% by weight |

| | |
|---|---|
| Bismuth (III) chloride | 0.4% by weight |
| Copper (I) chloride | 1.0% by weight |
| Lithium bromide | 7.0% by weight |

A cell having an active surface area of 135 cm² (9cm × 15 cm) is filled as described in Example 1. One of the electrodes is coated with a reflecting surface on its outer face. The darkening obtained by applying 2 volts makes it possible to control the light reflected through the cell from a maximum value corresponding to the clear state of the cell to a minimum value primarily corresponding to the reflection on the air/glass interface on the electrode facing the observer opposite to the electrode bearing the reflective layer. This embodiment is particularly useful for devices such as outside automotive rear view mirrors.

EXAMPLE 3

This example illustrates an electrolytic material for use in large area devices. An electrolytic material having the following composition is prepared:

| | |
|---|---|
| Diethylene glycol | 47.5% by weight |
| Levulinic acid | 47.5% by weight |
| Copper (I) chloride | 1.0% by weight |
| Lithium bromide | 4.0% by weight |

In this example, the copper chloride dissolution is only obtained after lithium bromide has been added to the material. A cell having an active surface area of 900 cm² (30cm × 30 cm) is filled with the material as described in Example 1. By applying 2 volts across the cell, the darkening of the overall active surface is observed. The optical response characteristics measured at 633 nm are the following:

| | |
|---|---|
| Darkening voltage | 2 volts |
| Bleaching voltage | 0 volt (short-circuit) |
| Initial transmission $T_o$ | 75% |
| Response time to reach 50% of $T_o$ | 75 seconds |
| Response time to reach 25% of $T_o$ | 150 seconds |
| Response time to go back to $T_o$ | 250 seconds |

EXAMPLE 4

A cell identical to that of Example 1 is filled with the electrolytic material of Example 3. Applying 1.5 volts across the cell yields a decrease of 75% of the initial transmission in 32 seconds corresponding to a charge consumption of 20 mC.cm$^{-2}$. The initial transmission level is restored in 26 seconds in short circuit condition.

COMPARATIVE EXAMPLE A

This example illustrates an electrolytic material without acid (C). An electrolytic material having the following composition is prepared:

| | |
|---|---|
| Γ-butyrolactone | 82% by weight |
| Bismuth (III) chloride | 1.35% by weight |
| Copper (I) chloride | 1.35% by weight |
| Lithium bromide | 8.55% by weight |
| Lithium perchlorate | 6.75% by weight |

A cell identical to that of Example 1 is filled with this electrolytic material. Applying 2 volts across the cell yields an inhomogeneous darkening. Bleaching is 5 times longer than the one observed with the cell of Example 1. Repetitive cycling leads to a fast degradation of the optical characteristics. The inhomogeneities tend to expand and the dynamic range of light modulation decreases.

COMPARATIVE EXAMPLE B

This example illustrates an electrolytic material without the salt (D). An electrolytic material having the following composition is prepared.

| | |
|---|---|
| γ-butyrolactone | 22% by weight |
| Acetic acid | 68.55% by weight |
| Bismuth (III) chloride | 1.35% by weight |
| Copper (I) chloride | 1.35% by weight |
| Lithium perchlorate | 6.75% by weight |

In this case, the dissolution of copper (I) chloride is not complete. A cell identical to that of Example 1 is filled with this electrolyte. Applying 2 volts across the cell yields an inhomogeneous darkening of the cell which cannot be erased by applying either a short circuit or a reversed voltage.

COMPARATIVE EXAMPLE C

This example illustrates an electrolytic material without the acid (C). An electrolytic material having the following composition is prepared:

| | |
|---|---|
| Diethylene glycol | 95% by weight |
| Copper (I) chloride | 1% by weight |
| Lithium bromide | 4% by weight |

A cell identical to that of Example 1 is filled with this electrolyte. Applying 1.5 volts across the cell yields a slow decrease of the optical transmission that does not reach 75% of the initial value. A 50% decrease is observed after 95 seconds.

While particular embodiments of the invention have been illustrated and described, it will be obvious to those skilled in the art that various changes and modifications may be made without departing from the true scope of this invention.

What is claimed is:

1. An electrolytic material for use in light modulation devices consisting essentially of a homogeneous solution of:
   (A) at least one organic solvent; and
   (B) at least one salt of an electrodepositable metal; characterized in that it further contains
   (C) at least one organic acid, and
   (D) at least one salt of a non-electrodepositable metal facilitating the dissolution of the salt (B).

2. An electrolytic material according to claim 1 wherein said solvent (A) has a boiling point higher than 100° C. and/or a freezing point lower than 0° C.

3. An electrolytic material according to claim 2 wherein said solvent (A) has both a boiling point higher than 100° C. and a freezing point lower than 0° C.

4. An electrolytic material according to claim 1 wherein said electrodepositable metal of salt (B) is selected from the group consisting of zinc, cadmium, lead, silver, copper, iron, nickel, tin, idium, platinum, palladium, gold, bismuth, antimony, tellurium, manganese, thallium, selenium, gallium, arsenic, mercury, chromium, tungsten and molybdenum.

5. An electrolytic material according to claim 4 wherein said salt of electrodepositable metal (B) is a salt of bismuth, a salt of copper (I), or a mixture of both.

6. An electrolytic material according to claim 4 wherein the anion of said salt (B) is a bromide, chloride, and/or iodide.

7. An electrolytic material according to claim 5 wherein the anion of said salt (B) is a bromide, chloride, and/or iodide.

8. An electrolytic material according to claim 1 wherein said organic acid (C) is selected from the group consisting of acetic acid, levulinic acid, and their mixture.

9. An electrolytic material according to claim 1 wherein said salt (D) is a salt of an alkali metal or alkaline earth metal, the anion of which is a complexant for the electrodepositable metal.

10. An electrolytic material according to claim 9 wherein the anion of said salt (D) is a bromide, a chloride and/or a iodide.

11. An electrolytic material according to claim 10 wherein said salt (D) is lithium bromide.

12. An electrolytic material according to claim 1 further containing an auxiliary salt (E) of an alkali metal or alkaline earth metal, the anion of which is a poor complexant for the electrodepositable metal of salt (B).

13. An electrolytic material according to claim 12 wherein said auxiliary salt (E) is lithium perchlorate.

14. An electro-optical device comprising a transparent cathode and an anode with their inner facing surfaces coated with an electrically conducting material, the space in between the electrodes being filled with an electrolytic material as defined in claim 1.

15. An electro-optic device according to claim 14 wherein said electrolytic material also contains an auxiliary salt (E) of an alkali metal or alkaline earth metal, the anion of which is a poor complexant for the electrodepositable metal of salt (B).

* * * * *